No. 829,197. PATENTED AUG. 21, 1906.
A. EISAMAN.
MANACLE.
APPLICATION FILED AUG. 9, 1905.
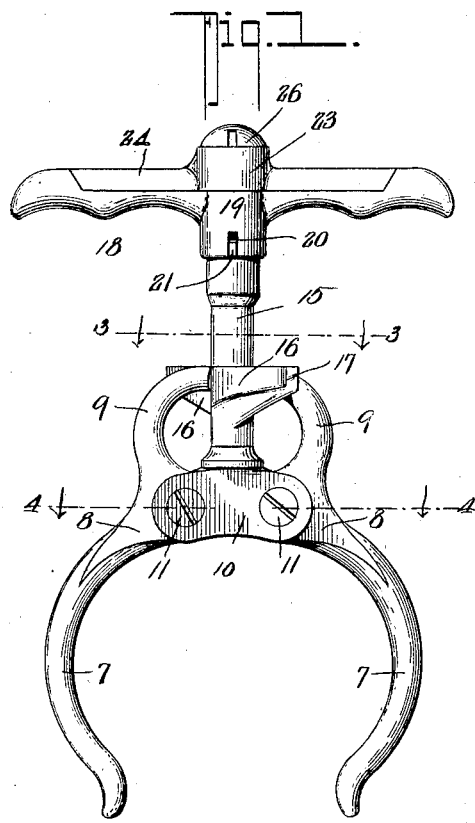
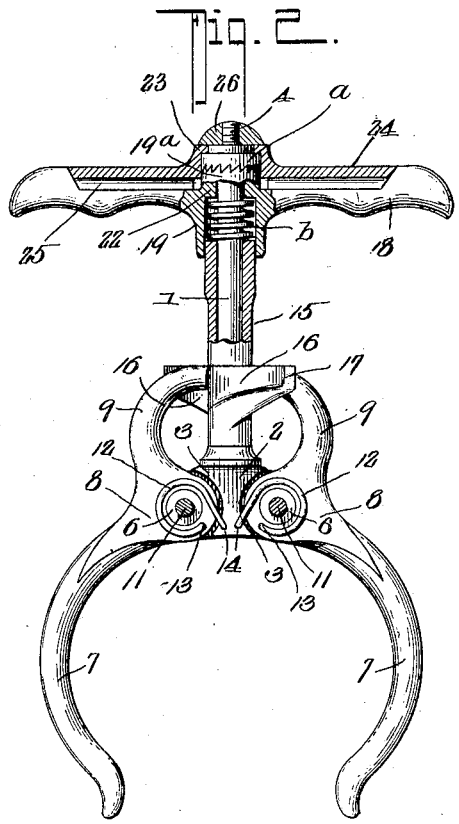
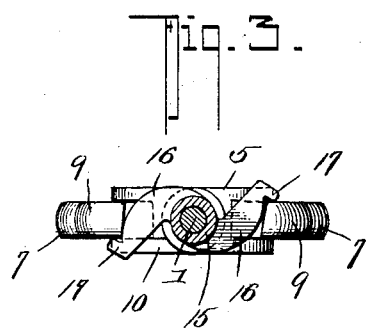
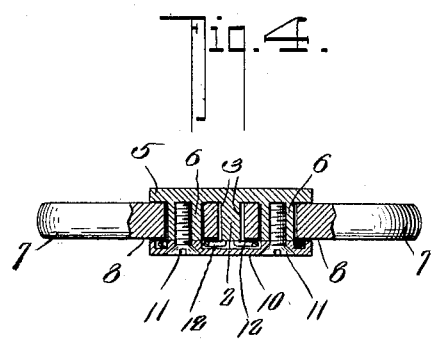
Witnesses
Amos Eisaman, Inventor
by C. A. Snow & Co.
Attorneys

UNITED STATES PATENT OFFICE.

AMOS EISAMAN, OF FAIRCHANCE, PENNSYLVANIA.

MANACLE.

No. 829,197.      Specification of Letters Patent.      Patented Aug. 21, 1906.

Application filed August 9, 1905. Serial No. 273,399.

*To all whom it may concern:*

Be it known that I, AMOS EISAMAN, a citizen of the United States, residing at Fairchance, in the county of Fayette and State of Pennsylvania, have invented a new and useful Manacle, of which the following is a specification.

This invention relates to manacles or handcuffs, and has for its object to provide certain new and useful improvements over my former patent, No. 394,162, issued December 11, 1888.

In particular it is designed to effectually prevent the jaw-actuating cam from being turned past and out of engagement with the rear ends of the jaws and to house the ratchet mechanism between the handle and the stem of the device, so as to protect the palm of the hand of the operator.

With this object in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the accompanying drawings, Figure 1 is a side elevation of a manacle embodying the features of the present invention. Fig. 2 is a similar view, parts being broken away to show the ratchet mechanism within the handle and the jaw-retaining plate being removed to disclose the manner of pivotally mounting the jaws. Fig. 3 is a cross-sectional view on the line 3 3 of Fig. 1, showing the jaws closed and locked by the jaw-controlling cam. Fig. 4 is a cross-sectional view on the line 4 4 of Fig. 1.

Like characters of reference designate corresponding parts in each and every figure of the drawings.

The present device is made up of a cylindrical stem 1, which is provided at one end with a head 2, having concaved recesses 3 in opposite sides thereof, the other end of the stem being reduced and threaded, as shown at 4. Ears 5 are provided at the head end of the stem and project beyond the respective concave faces of the head, with tapped bosses or projections 6 extending centrally from the ears and disposed concentrically with respect to the recesses 3. Upon each of the bosses 6 is a movable jaw 7, which is provided at its inner end with a perforate ear 8, receiving the adjacent boss and working in the adjacent recess 3, there being a heel portion 9 extending rearwardly from the pivot end of the jaw and bowed inwardly toward the stem. A retaining-plate 10 is applied across the ears of the jaws and is provided with a pair of perforations to receive screw-threaded fastenings 11, which take into the tapped bosses 6, thereby to retain the jaws in place. Encircling each fastening 11 between the plate 10 and the adjacent jaw is a spring 12, having one end portion 13 fitted into a seat or socket in the ear of the jaw and its opposite end portion 14 fitted in a seat or socket in the head 2 of the stem 1, the tendency of the springs being to separate the forward free ends of the jaws.

Rotatably encircling the stem 1 is a sleeve 15, which terminates short of the threaded extremity 4 of the stem and carries a double cam 16, having its respective members frictionally bearing against the free ends of the heel portions 9 of the jaws, so that by turning the cam in one direction to wipe the cam across the heels of the jaws the free ends of the latter will be drawn inwardly in a positive and effective manner. Upon the outer free end of each cam member there is a shoulder 17, which, as best shown in Fig. 3 of the drawings, is designed to engage the heel portion of the adjacent jaw, so as to prevent the cam from rotating past the heel, and thereby free the jaw.

Upon the outer end of the stem there is a handle-bar 18, which is provided at its middle with a hub 19, rotatably embracing the stem and the adjacent portion of the sleeve 15, the inner end of the hub being provided with a notch or seat 20 for the reception of a pin or projection 21, carried by the sleeve 15 to prevent rotation of the handle-bar upon the sleeve, the notch being of a length to permit sliding of the hub upon the sleeve. The hub 19 projects slightly beyond the other side of the handle-bar, as at 19$^a$, and is provided with ratchet-teeth for engagement with similar ratchet-teeth upon the inner face of a ratchet-disk $a$, fixed upon the stem. A helical spring $b$ embraces the stem within the hub 19 and bears against the outer end of the sleeve 15 and against an internal annular shoulder 22 within the hub, thereby to yieldably force the handle-bar outwardly and engage its ratchet-teeth with the ratchet-disk $a$, so as to prevent rotation of the handle-bar and the sleeve 15 upon the stem, and thus lock the jaws against pivotal movements. By pressing inwardly upon the handle-bar the ratchet-teeth of the latter may be disengaged from the ratchet-disk $a$, whereupon the handle-bar may be rotated so as to rotate the sleeve 15 and the cams 16 around the stem, and thereby open or close the jaws, according to the direction of rotation. The handle-bar can of course rotate in one direction without pressing inwardly upon the same, which direction of movement tends to close the jaws, but the handle-bar is locked against rotation in the other direction in order to prevent accidental opening of the jaws, it being necessary to first press inwardly upon the handle to permit backward rotation thereof to open the jaws.

Covering the ratchet-disk $a$ is a cap 23, which is provided with diametrically opposite semitubular arms 24, which embrace the reduced portions 25 of the outer side of the handle-bar so as to lie flush with the handle-bar, and thereby form a smooth unbroken hand-grasp. This cap is intended to protect the hand of the user from being cut and bruised by the ratchet device, and said cap is held in place by means of a hemispherical nut 26, which is fitted to the threaded extremity 4 of the stem and presents a smooth rounded boss to fit in the palm of the hand.

In using the device the handle-bar is first pushed inwardly and then rotated to the left, so as to open the jaws, after which the latter are placed astraddle of the wrist and the handle-bar given a quick turning to the right, so as to wipe the double cam across the heel portions of the jaws, and thereby swing the same inwardly and close them around the wrist, which quickly and effectually fastens the manacle in place.

Having fully described the invention, what is claimed is—

1. A manacle comprising a stem, a pair of jaws pivotally mounted upon the stem, a double cam mounted to rotate upon the stem in frictional contact with the jaws to close the same, the cam being provided with shoulders for engagement with the jaws to prevent the cam from being turned past the jaws, and means to rotate the cam.

2. A manacle comprising a stem, a pair of jaws pivoted thereon, a sleeve rotatable upon the stem, a cam carried by the sleeve and working in frictional engagement with the jaws to close the same, a handle-bar having a hub rotatably and slidably embracing the stem and connected to the sleeve to rotate simultaneously therewith and to slide thereon, the outer end of the hub being provided with ratchet-teeth, a ratchet-disk fixed upon the stem, a spring to yieldably hold the ratchet-teeth of the handle-bar in engagement with the ratchet-disk, and a protecting cap housing the ratchet members.

3. A manacle comprising a stem, a pair of jaws pivoted thereon, a sleeve rotatable upon the stem, a cam carried by the sleeve and working in frictional engagement with the jaws to close the same, a handle-bar having a hub rotatably and slidably embracing the stem and connected to the sleeve to rotate simultaneously therewith and to slide thereon, the outer end of the hub being provided with ratchet-teeth, a ratchet-disk fixed upon the stem, a spring to yieldably hold the ratchet-teeth of the handle-bar in engagement with the ratchet-disk, a cap embracing the ratchet members and provided with diametrically opposite semitubular arms embracing the handle-bar, the handle-bar being reduced to have the arms fit flush with the exterior thereof, and a retaining-nut fitted upon the outer end of the stem to hold the cap in place.

In testimony that I claim the foregoing as my own I have hereto affixed my signature in the presence of two witnesses.

AMOS EISAMAN.

Witnesses:
   Jno. Boyle,
   Alex. McBeth.